United States Patent [19]

Willis, Jr.

[11] Patent Number: 4,964,315
[45] Date of Patent: Oct. 23, 1990

[54] TRANSMISSION HAVING DUAL COUNTERROTATING OUTPUT SHAFTS

[75] Inventor: Robert J. Willis, Jr., Ipswich, Mass.

[73] Assignee: General Electric Company, Lynn, Mass.

[21] Appl. No.: 657,435

[22] Filed: Oct. 3, 1984

[51] Int. Cl.⁵ .............................................. F16H 37/06
[52] U.S. Cl. ............................. 74/665 GA; 74/665 S; 74/665 K
[58] Field of Search ..................... 74/674, 665 K, 664, 74/665 GA, 665 R, 665 F, 805, 665 H, 665 S, 801, 665 P, 803

[56] References Cited

U.S. PATENT DOCUMENTS

| | | | |
|---|---|---|---|
| 1,381,939 | 6/1921 | Small | 416/129 |
| 1,921,893 | 8/1933 | Steele | 74/665 K |
| 2,050,283 | 8/1936 | Dixon, Jr. | 74/665 K |
| 2,062,293 | 12/1936 | Cashman | 74/665 K |
| 2,185,545 | 1/1940 | Egan | 74/665 K |
| 2,192,469 | 3/1940 | Green | 74/665 K |
| 2,216,013 | 9/1940 | Kenney | 74/665 K |
| 2,222,102 | 11/1940 | Johnson | 74/665 K |
| 2,480,806 | 8/1949 | Desmoulins | 74/801 |
| 2,496,857 | 2/1950 | Cronstedt et al. | 74/665 K |
| 2,700,311 | 1/1955 | Bade | 74/674 |
| 3,038,307 | 6/1962 | Oprecht | 74/675 |
| 3,188,884 | 6/1965 | Bancroft | 74/665 K |
| 3,252,355 | 5/1966 | Hewko | 74/665 K |
| 3,705,522 | 12/1972 | Ogawa | 74/803 |
| 4,132,131 | 1/1979 | DeBruyne | 74/675 |
| 4,251,987 | 2/1981 | Adamson | 74/665 S |

FOREIGN PATENT DOCUMENTS

| | | |
|---|---|---|
| 809132 | 7/1951 | Fed. Rep. of Germany . |
| 716306 | 12/1931 | France . |
| 454555 | 1/1950 | Italy ........................................ 74/674 |
| 594205 | 11/1947 | United Kingdom . |
| 598699 | 3/1948 | United Kingdom . |
| 1421704 | 1/1976 | United Kingdom . |

OTHER PUBLICATIONS

C. Carmichael (Editor), *Kent's Mechanical Engineers' Handbook*, 1950, pp. 14-48 through 14-55.
D. W. Dudley (Editor), *Gear Handbook*, 1962, pp. 3-1 through 3-27 and pp. 4-1 through 4-3.
R. J. Willis, Jr., "Lightest-Weight Gears," 1963, article from *Product Engineering*.
R. J. Willis, Jr., "On the Kinematics of the Closed Epicyclic Differential Gears," 1982, ASME Paper No. 81-DET-111.

*Primary Examiner*—Dirk Wright
*Attorney, Agent, or Firm*—Francis L. Conte; Jerome C. Squillaro

[57] ABSTRACT

The present invention includes a stationary housing having disposed therein an epicyclic star gearset including sun, idler, and ring gears. The sun gear includes an input shaft extending therefrom, and the ring gear includes a first output shaft extending therefrom. A bull gear having a second output shaft extending therefrom is also provided and is operatively connected to a pinion gear, which pinion gear is fixedly connected to an idler shaft extending from said idler gear. In accordance with a preferred embodiment of the invention, the gears are predeterminedly sized for obtaining equal and opposite rotation of the first and second output shafts during operation.

20 Claims, 2 Drawing Sheets

TRANSMISSION HAVING DUAL COUNTERROTATING OUTPUT SHAFTS

BACKGROUND OF THE INVENTION

The present invention relates generally to transmissions having counter-rotating output shafts, and, more specifically, to a gas turbine engine having a transmission effective for obtaining equal and opposite speeds of dual output shafts for driving counter-rotating propellers.

Dual output, counter-rotating transmissions for gas turbine engines are known. Such transmissions typically include epicyclic gearsets which are effective for providing counter-rotating output shafts and dividing torque and power received from a gas turbine engine output shaft. However, such transmissions tend to be of the differential type wherein equal and opposite output shaft speed is not maintainable with equal power division without the use of additional, complex synchronizing means and/or a predetermined apportionment of loading torque for maintaining such equal speeds. Furthermore, power requirements for modern gas turbine engines vary from about 8,000 to 11,000 shaft horsepower which, accordingly, requires a suitable transmission effective for handling such relatively high power.

It is desirable to provide transmissions which divide input power substantially equally between two counter-rotating propellers. The transmission should also be light, relatively simple, highly durable, and highly reliable and should have coaxial positioning of input and output shafts, or so-called in-line construction.

It is therefore an object of the present invention to provide a new and improved transmission having counter-rotating output shafts.

Another object of the present invention is to provide a new and improved transmission for a gas turbine engine which is relatively simple yet effective for transmitting power in the range of up to about 8,000 to 11,000 shaft horsepower.

Another object of the present invention is to provide a new and improved transmission effective for obtaining equal and opposite rotation of dual output shafts thereof throughout the transmission's entire speed range.

Another object of the present invention is to provide a new and improved transmission effective for maintaining a fixed, phased relationship between dual output shafts thereof.

Another object of the present invention is to provide a new and improved transmission effective for providing equal torque to dual output shafts thereof while maintaining equal and opposite rotation thereof.

SUMMARY OF THE INVENTION

The present invention includes a stationary housing having disposed therein an epicyclic star gearset including sun, idler, and ring gears, the sun gear including an input shaft extending therefrom, and the ring gear including a first output shaft extending therefrom. A bull gear including a second output shaft extending therefrom is also provided and is operatively connected to a pinion gear, which pinion gear is fixedly connected to an idler shaft extending from said idler gear. In accordance with a preferred embodiment of the invention, the gears are predeterminedly sized for obtaining equal and opposite rotation of the first and second output shafts during operation.

BRIEF DESCRIPTION OF THE DRAWING

The novel features believed characteristic of the invention are set forth in the appended claims. The invention, itself, together with further objects and advantages thereof is more particularly described in the following detailed description taken in conjunction with the accompanying in which:

DETAILED DESCRIPTION

Figure 1:
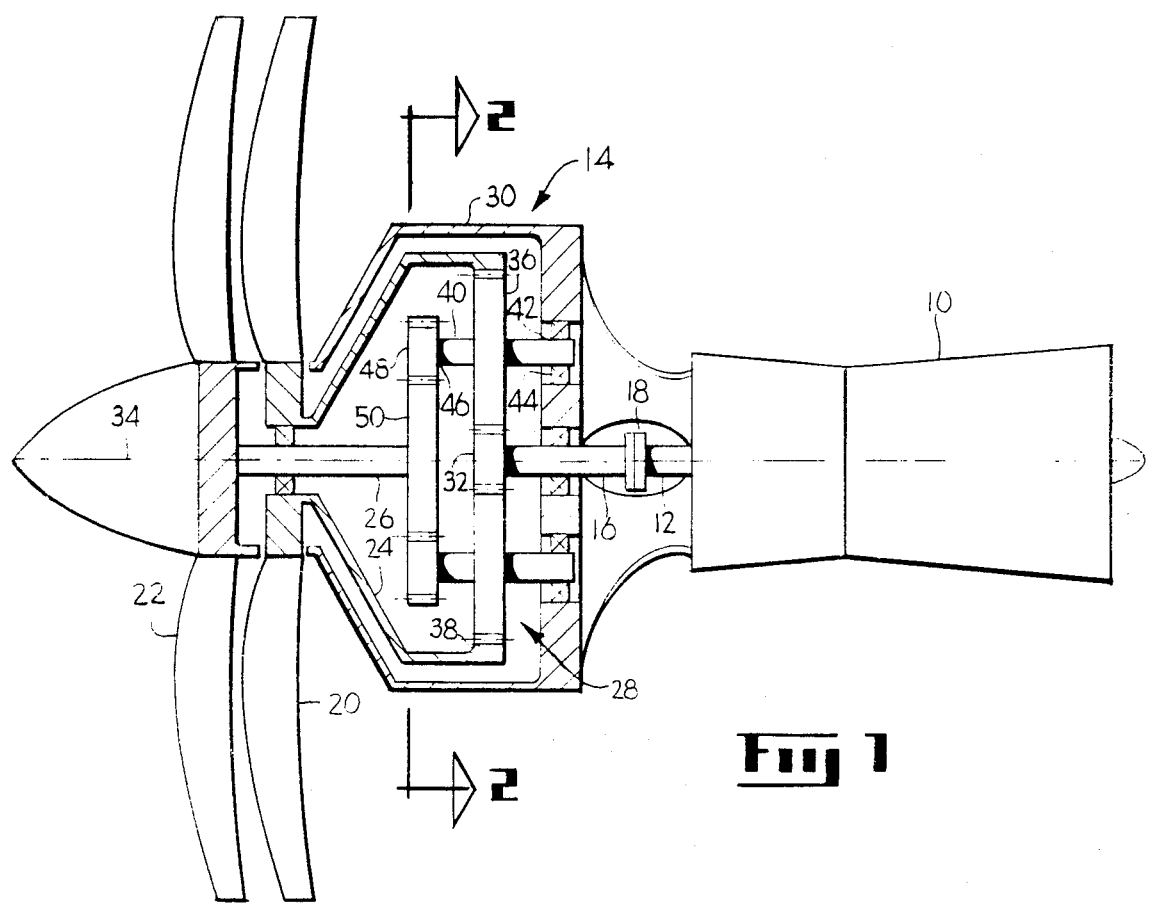
FIG. 1 is a partial cross-sectional view of a gas turbine engine including an exemplary embodiment of transmission according to the present invention.

Illustrated in FIG. 1 is a conventional gas turbine engine 10 including an output shaft 12. A transmission indicated generally at 14, according to one embodiment of the present invention, includes an input shaft 16 suitably connected to the output shaft 12 of the gas turbine engine 10, for example, by a flange assembly 18. The transmission 14 is effective for driving two rows of a plurality of circumferentially spaced aft and forward propellers 20 and 22, respectively, suitably connected to first and second output shafts 24 and 26, respectively, of the transmission 14.

According to the exemplary embodiment of the transmission 14 illustrated in FIG. 1, an epicyclic star gearset 28 is suitably mounted in a stationary housing 30 of the transmission 14. The epicyclic gearset 28 includes a sun gear 32 to which the input shaft 16 is fixedly connected, both being disposed coaxially about a longitudinal centerline axis 34 of the transmission 14 and the engine 10. The epicyclic gearset 28 further includes a plurality of circumferentially spaced star or idler gears 36 (see FIG. 2) operatively connected to the sun gear 32 for rotation therewith. A ring gear 38 is also included and is disposed circumferentially around the idler gears 36 and is fixedly connected to the first output shaft 24 for rotation therewith, both being disposed coaxially with the centerline 34.

Extending through each of the idler gears 36, and suitably secured thereto, is an idler shaft 40. A first end 42 of the idler shaft 40 is suitably rotatably attached to the housing 30, by a bearing 44, for example, fixedly attached thereto for allowing rotation of the idler gear 36 with the shaft 40. Inasmuch as the gearset 28 is an epicyclic star gearset, the plurality of idler gears 36 do not revolve about the sun gear 32 as would occur in a planetary gearset. Fixedly attached to an opposite, second end 46 of each of the idler shafts 40 is a pinion gear 48. A bull gear 50 is fixedly attached coaxially to the second output shaft 26 and is disposed coaxially along the centerline 34 and radially inwardly of the pinion gears 48 and operatively connected thereto for rotation therewith.

In operation, input shaft 16 causes sun gear 32 to rotate which causes idler gears 36 and pinion gears 48 to rotate in an opposite direction to the input shaft 16 and the sun gear 32. Idler gears 36, in turn, cause ring gear 38, and the first output shaft 24 attached thereto, to rotate in a direction opposite to the direction of the input shaft 16. The pinion gears 4B cause the bull gear 50 to rotate in a direction equal to that of the input shaft 16 and opposite to the first output shaft 24.

Inasmuch as the epicyclic gearset 28 is a star gearset wherein the idler or star gears 36 are not free to revolve about the sun gear 32, as would occur in a planetary gearset, a fixed relationship between the gears is provided and no differential performance occurs. Accordingly, the rotation of the output shafts 24 and 26 is a fixed, direct relationship to that of the input shaft 16. Furthermore, because of this fixed relationship, a predetermined, fixed phase or angular positional relationship of the output shafts 24 and 26 is obtained. This allows for preferred phase relationship between the aft and forward propellers 20 and 22 for reducing noise, for example.

Figure 2:
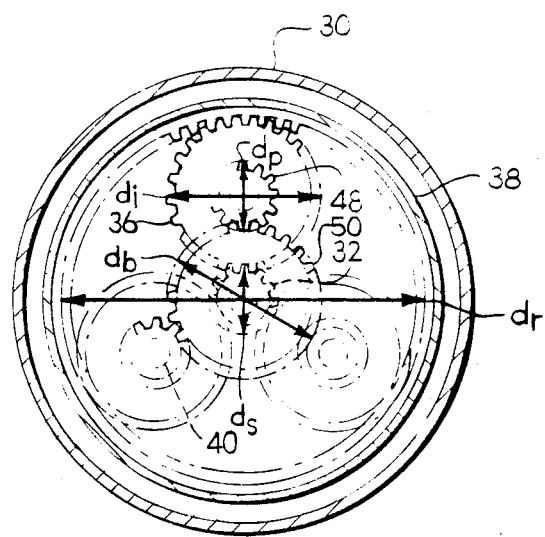
FIG. 2 is an end view of the transmission illustrated in FIG. 1 taken along line 2—2.

In the preferred embodiment illustrated in FIGS. 1 and 2, the gearset 28, bull gear 50, and pinion gears 48 are sized so that equal and opposite rotational speeds of the output shafts 24 and 26 are obtained. More specifically, the sun gear 32, the idler gears 36, the pinion gears 4S, the ring gear 38, and the bull gear 50 each has a gear pitch diameter represented by $d_s$, $d_i$, $d_p$, $d_r$, and $d_b$, respectively. An overall reduction ratio $M_o$ from the input shaft 16 to each of the output shafts 24 and 26 exhibits the following relationships:

$$d_i/d_s = (M_o - 1)/2;$$

$$d_r/d_S = M_{o2};$$

$$d_p/d_s = (M_o - 1)/(6M_o - 2); \text{ and}$$

$$d_b/d_s = M_o(M_o + 1)/(3M_o - 1).$$

It has been determined that the transmission 14 as above described is effective for obtaining overall reduction ratios $M_o$ from about 3.0 to about 14.0, the upper limit being due to size limitations of the various gears. Accordingly, it should be appreciated that the relatively simple transmission 14, itself, is effective for obtaining equal and opposite output shaft speeds over a substantial reduction ratio $M_o$ range without the need for addition speed reduction assemblies. Furthermore, the transmission 14 can be suitably sized for use in a gas turbine engine 10 for being effective for transmitting up to, for example, about 11,000 shaft horsepower to the counter-rotating propellers 20 and 22.

Although equal and opposite output rotational speeds are provided by the transmission 14, it will be appreciated that the torques transmitted to the first and second output shafts 24 and 26 are not necessarily equal. However, because of the fixed relationship of the gears within the transmission 14 which provide for a fixed relationship in output speed of the shafts 24 and 26, the ability to obtain equal output torques is possible when desired.

For example, the pitch of each of the aft and forward propellers 20 and 22 can be adjusted to provide different loading to the first and second output shafts 24 and 26, respectively, for obtaining equal torques therein. However, the fixed relationship of output speeds of the output shafts 24 and 26 is nevertheless maintained. In such a mode of operation, the differential loadings in the output shafts 24 and 26 are accomodated by the reaction of the idler shaft 40 in the housing 30. However, this torque is relatively small inasmuch as it represents only the difference in torques between the first and second output shafts 24 and 26.

Of course, when both forward and aft propellers 20 and 22 are operated at substantially identical pitch, correspondingly different torques are experienced in the first and second output shafts 24 and 26 with a substantially zero reaction load occurring between the idler shaft 40 and the housing 30.

Although a preferred embodiment of the present invention has been disclosed, other embodiments will become apparent to those skilled in the art from the teachings herein. For example, although three pinion gears 48 are disclosed, two, and even one, may also be utilized. However, at least three symmetrically spaced pinions 48 and idler gears 36 are preferred for obtaining balanced and distributed loads.

Having thus described a preferred embodiment of the invention, what is desired to be secured by Letters Patent of the United States is:

1. A transmission comprising:
   an epicyclic star gearset including sun, idler, and ring gears;
   a bull gear having a gear pitch diameter; and
   a pinion gear having a gear pitch diameter less than said bull gear pitch diameter and operatively connected to said idler and bull gears for rotation therewith.

2. A transmission according to claim 1 further including:
   an input shaft fixedly joined to said sun gear;
   an idler shaft fixedly interconnecting said idler gear and said pinion gear, and rotatably connected to a stationary member;
   a first output shaft fixedly joined to said ring gear; and
   a second output shaft fixedly joined to said bull gear;
   said first and second output shafts being rotatable in opposite directions.

3. A transmission according to claim 2 wherein said input shaft and said first and second output shafts are disposed coaxially about a longitudinal centerline of said transmission.

4. A transmission according to claim 2 wherein said epicyclic star gearset, bull gear, and pinion gear are sized for obtaining equal and opposite rotational speeds of said first and second output shafts.

5. A transmission according to claim 2 wherein said epicyclic gearset, bull gear, and pinion gear are sized for obtaining an overall reduction ratio $M_o$ from said input shaft to each of said output shafts within a range of about 3.0 to about 14.0.

6. A transmission according to claim 2 wherein said sun gear, idler gear, pinion gear, ring gear, and bull gear each has a gear pitch diameter represented by $d_s$, $d_i$, $d_p$, $d_r$, and $d_b$ respectively, and $M_o$ represents an overall reduction ratio from said input shaft to each of said output shafts and wherein for obtaining equal and opposite speeds of said first and second output shafts the following relationships apply:

$$d_i/d_s = (M_o - 1)/2;$$

$$d_r/d_s = M_{o2};$$

$$d_p/d_s = (M_o - 1)/(6M_o - 2); \text{ and}$$

$$d_b/d_s = M_o(M_o + 1)/(3M_o - 1).$$

7. A transmission according to claim 6 wherein said overall reduction ratio $M_o$ is within a range of about 3.0 to about 14.0.

8. A transmission comprising:
   a stationary housing;
   an epicyclic star gearset including sun, idler, and ring gears, said idler gear including an idler shaft extending coaxially therefrom and having a first end rotatably joined to said stationary housing, said sun gear including an input shaft extending therefrom and said ring gear including a first output shaft extending therefrom;

a bull gear disposed coaxially about a longitudinal centerline axis of said gearset and coaxial with said input shaft, and including a second output shaft extending therefrom; and a pinion gear fixedly joined to a second end of said idler shaft and being operatively connected to said bull gear for rotation therewith;

said input shaft extending in one direction from said epicyclic star gearset, and both said first and second output shafts extending from said epicyclic star gearset in a direction opposite to said one direction; and said epicyclic star gearset, bull gear, and pinion gear being sized so that said first and second output shafts are rotatable in opposite directions at equal rotational speeds.

9. A transmission according to claim 8 wherein said epicyclic gearset, bull gear and pinion gear are sized for obtaining an overall reduction ratio $M_o$ from said input shaft to each of said output shafts within the range of about 3.0 to about 14.0.

10. For a gas turbine engine, a transmission comprising:

a stationary housing;

an epicyclic star gearset including sun, idler, and ring gears, said idler gear including an idler shaft extending coaxially therefrom and having a first end rotatably joined to said stationary housing, said sun gear including an input shaft extending therefrom and said ring gear including a first output shaft extending therefrom;

a bull gear disposed coaxially about a longitudinal centerline axis of said gearset and coaxial with said input shaft, and including a second output shaft extending therefrom; and a pinion gear fixedly joined to a second end of said idler shaft and being operatively connected to said bull gear for rotation therewith;

said epicyclic star gearset, bull gear, and pinion gear being sized so that said first and second output shafts are rotatable in opposite directions at equal rotational speeds.

11. A transmission for a gas turbine engine according to claim 10 wherein each of said first and second output shafts further includes a plurality of circumferentially spaced propellers attached thereto.

12. A transmission for a gas turbine engine according to claim 11 wherein said input and first and second output shafts are coaxial, and said sun gear, idler gear, pinion gear, ring gear, and bull gear each have a gear pitch diameter represented by $d_s$, $d_i$, $d_p$, $d_r$, and $d_b$, respectively, and $M_o$ represents an overall reduction ratio from said input shaft to each of said output shafts and wherein for obtaining equal and opposite speeds of said first and second output shafts the following relationships apply:

$d_i/d_s = (M_o - 1)/2$;
$d_r/d_s = M_o$;
$d_p/d_s = (M_o^2 - 1)/(6M_o - 2)$; and
$d_b/d_s = M_o(M_o + 1)/(3M_o - 1)$.

13. A transmission according to claim 12 wherein said overall reduction ratio $M_o$ is within a range of about 3.0 to about 14.0.

14. A transmission for gas turbine engine according to claim 10 wherein said first output shaft includes a plurality of circumferentially-spaced aft propellers attached thereto and said second output shaft includes a plurality of circumferentially-spaced forward propellers attached thereto, and wherein pitch of said forward and aft propellers is adjustable for providing differential loading to said first and second output shafts for obtaining equal torques in said first and second output shafts.

15. A transmission according to claim 2 wherein said idler gear is disposed radially outwardly of said sun gear and radially inwardly of said ring gear.

16. A transmission according to claim 9 wherein said idler gear is disposed radially outwardly of said sun gear and radially inwardly of said ring gear.

17. A transmission according to claim 10 wherein said idler gear is disposed radially outwardly of said sun gear and radially inwardly of said ring gear.

18. A transmission according to claim 13 further including at least three circumferentially-spaced ones of said idler gear and wherein said ring gear includes radially inwardly facing gear teeth.

19. A transmission according to claim 8 wherein said ring gear includes radially inwardly facing gear teeth.

20. A transmission according to claim 2 wherein said input shaft, first output shaft, and second output shaft are coaxial.

* * * * *

UNITED STATES PATENT AND TRADEMARK OFFICE
CERTIFICATE OF CORRECTION

PATENT NO. : 4,964,315　　　　　　　　　　Page 1 of 2

DATED : October 23, 1990

INVENTOR(S) : Robert J. Willis, Jr.

It is certified that error appears in the above-identified patent and that said Letters Patent is hereby corrected as shown below:

In the Specification in Column 3, lines 24 and 26, change

"$d_r/d_s = M_O2;$ $d_p/d_s = (M_O - 1)/(6M_O - 2);$ and" to

--$d_r/d_s = M_O;$ $d_p/d_s = (M_O^2 - 1)/(6M_O - 2);$ and--.

UNITED STATES PATENT AND TRADEMARK OFFICE
CERTIFICATE OF CORRECTION

PATENT NO. : 4,964,315

DATED : October 23, 1990

INVENTOR(S) : Robert J. Willis Jr.

It is certified that error appears in the above-identified patent and that said Letters Patent is hereby corrected as shown below:

In Claim 6, Column 4, lines 56 and 58, change

"$d_r/d_s = M_o2;$ $d_p/d_s = (M_o - 1)/(6M_o - 2);$ and" to

--$d_r/d_s = M_o;$ $d_p/d_s = (M_o^2 - 1)/(6M_o - 2);$ and--.

Signed and Sealed this

Twenty-fifth Day of February, 1992

Attest:

HARRY F. MANBECK, JR.

*Attesting Officer*     *Commissioner of Patents and Trademarks*